United States Patent [19]

Gerhold et al.

[11] Patent Number: 5,176,893
[45] Date of Patent: Jan. 5, 1993

[54] SILICON NITRIDE PRODUCTS AND METHOD FOR THEIR PRODUCTION

[75] Inventors: Bruce W. Gerhold; George F. Schuette, both of Bartlesville, Okla.; Kenneth E. Inkrott, Houston, Tex.

[73] Assignee: Phillips Petroleum Company, Bartlesville, Okla.

[21] Appl. No.: 416,190

[22] Filed: Oct. 2, 1989

[51] Int. Cl.$^5$ ............................................. C04B 35/58
[52] U.S. Cl. ...................................... 423/344; 501/97
[58] Field of Search .................... 501/88, 97; 422/194; 423/314, 345, 406

[56] References Cited

U.S. PATENT DOCUMENTS

| | | | |
|---|---|---|---|
| 2,614,946 | 10/1952 | Proudfoot | 117/100 |
| 2,632,713 | 3/1953 | Krejci | 106/307 |
| 3,025,192 | 3/1962 | Lowe | 148/33 |
| 3,085,863 | 4/1963 | Prener | 23/208 |
| 3,161,473 | 12/1964 | Pultz | 23/208 |
| 3,253,886 | 5/1966 | Lamprey et al. | 23/134 |
| 3,275,722 | 9/1966 | Popper | 264/65 |
| 3,306,705 | 2/1967 | Leineweber et al. | 23/208 |
| 3,340,020 | 9/1967 | Neuenschwander et al. | 23/349 |
| 3,346,338 | 10/1967 | Latham | 23/208 |
| 3,352,637 | 11/1967 | Heymer et al. | 23/191 |
| 3,368,871 | 2/1968 | O'Conner et al. | 23/208 |
| 3,399,980 | 9/1968 | Bourdeau | 23/345 |

(List continued on next page.)

FOREIGN PATENT DOCUMENTS

| | | | |
|---|---|---|---|
| 1214309 | 11/1986 | Canada. | |
| 0087798 | 9/1983 | European Pat. Off. | 423/344 |
| 0272377 | 6/1988 | European Pat. Off. | 423/406 |
| 0313980 | 10/1988 | European Pat. Off. | |
| 0132500 | 10/1979 | Japan | 423/344 |
| 2040902 | 1/1980 | United Kingdom. | |

OTHER PUBLICATIONS

Day, R. J., P. L. Walka and C. C. Wright, "The Carbon-Oxygen Reaction at High Temperature," In *Industrial Carbon and Graphite* (London, Society of Chemical Industry, 1958), p. 348.

Haslam, Robert T. and Robert P. Russell. *Fuels and Their Combustion*, N. Y., McGraw-Hill, 1926, pp. 318-322.

*North American Combustion Handbook*, 2nd ed., Cleveland, North American Mfg. Co., 1978, pp. 232-251.

*Kirk-Othmer Encyclopedia of Chemical Technology*, (1980 ed.), vol. 11, pp. 821, 832-835.

Edwards, John B. *Combustion*, Ann Arbor, Mich., Ann Arbor Science Publishers, Inc., 1974, pp. 7, 14, 149-151.

Walker, P. L., Jr., ed., *Chemistry and Physics of Carbon*, N. Y., Marcel Dekker, Inc., 1965, pp. 204-229.

PhilNews, Phillips Petroleum Company, vol. 12, No. 1 (1987), pp. 5 and 6.

*Ceramic Industry*, vol. 124, No. 1 (Jan. 1985), pp. 54 and 56.

Richerson, D. W. "What are Ceramics?" *Chemical Engineering*, vol. 20, No. 19, (Sep. 1982), pp. 123, 124, 126.

*Primary Examiner*—Robert Kunemund
*Assistant Examiner*—Ken Horton
*Attorney, Agent, or Firm*—William R. Sharp

[57] ABSTRACT

A method and apparatus are provided for producing a product comprising a nitride compound, such as for example silicon nitride. A reactor is provided which has a chamber defined therein which is divided into a combustion zone and a reaction zone. A combustible mixture is injected into the combustion zone and accordingly combusted to form hot combustion products. At least one reactant (i.e. silane) is injected at the boundary between the zones so as to be carried into the reaction zone by the combustion products and react to form raw product comprising the nitride compound. The raw product can be purified by subsequent processing to remove oxygen and convert by-products to the desired nitride compound. The product of the invention has a low level of impurities and is made up of primarily submicron, highly uniform particles. This makes the product particularly useful for fabrication of sintered ceramic parts.

30 Claims, 8 Drawing Sheets

U.S. PATENT DOCUMENTS

| | | | |
|---|---|---|---|
| 3,485,591 | 12/1969 | Evans et al. | 23/208 |
| 3,839,542 | 10/1974 | Chase | 423/346 |
| 3,877,876 | 4/1975 | Cheng | 422/194 |
| 3,979,500 | 9/1976 | Sheppard et al. | 423/289 |
| 4,036,653 | 7/1977 | Jacobsen | 423/344 |
| 4,133,689 | 1/1979 | Stroke | 106/44 |
| 4,162,167 | 7/1979 | Enomoto et al. | 106/44 |
| 4,188,368 | 2/1980 | Wolf | 423/350 |
| 4,248,844 | 2/1981 | Ramsey, Jr. et al. | 423/345 |
| 4,283,375 | 8/1981 | Horne, Jr. et al. | 423/345 |
| 4,284,612 | 8/1981 | Horne, Jr. et al. | 423/345 |
| 4,342,837 | 8/1982 | Suzuki et al. | 501/90 |
| 4,364,974 | 12/1982 | Gert | 427/213 |
| 4,377,563 | 3/1983 | Seimiya | 423/345 |
| 4,419,336 | 12/1983 | Kuriakose | 423/345 |
| 4,431,749 | 7/1982 | Iya et al. | 423/349 |
| 4,435,476 | 3/1984 | Phillips et al. | 428/412 |
| 4,482,669 | 11/1984 | Dietmar et al. | 524/442 |
| 4,500,504 | 2/1985 | Yamamoto | 423/345 |
| 4,504,453 | 3/1985 | Tanaka et al. | 423/345 |
| 4,521,393 | 6/1985 | Saito et al. | 423/344 |
| 4,525,335 | 6/1985 | Tanaka et al. | 423/344 |
| 4,535,007 | 8/1985 | Cannady | 427/226 |
| 4,543,344 | 9/1985 | Cannady | 501/92 |
| 4,548,798 | 10/1985 | Rice | 423/263 |
| 4,571,331 | 2/1986 | Endou et al. | 423/345 |
| 4,591,492 | 5/1986 | Tanaka et al. | 423/345 |
| 4,604,273 | 8/1986 | Czupryna et al. | 423/344 |
| 4,622,001 | 11/1986 | Gilman | 432/13 |
| 4,640,830 | 2/1987 | Arakawa | 423/346 |
| 4,668,642 | 5/1987 | Bujalski | 501/88 |
| 4,757,035 | 7/1988 | Bancy et al. | 501/88 |
| 4,891,339 | 1/1990 | Calcote et al. | 423/344 |

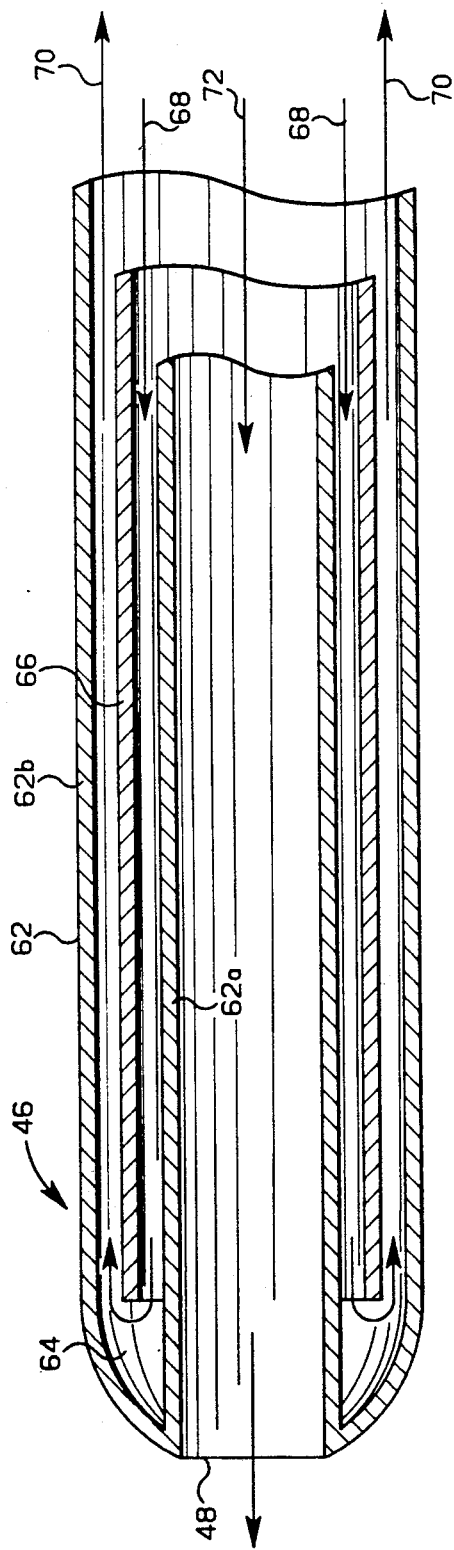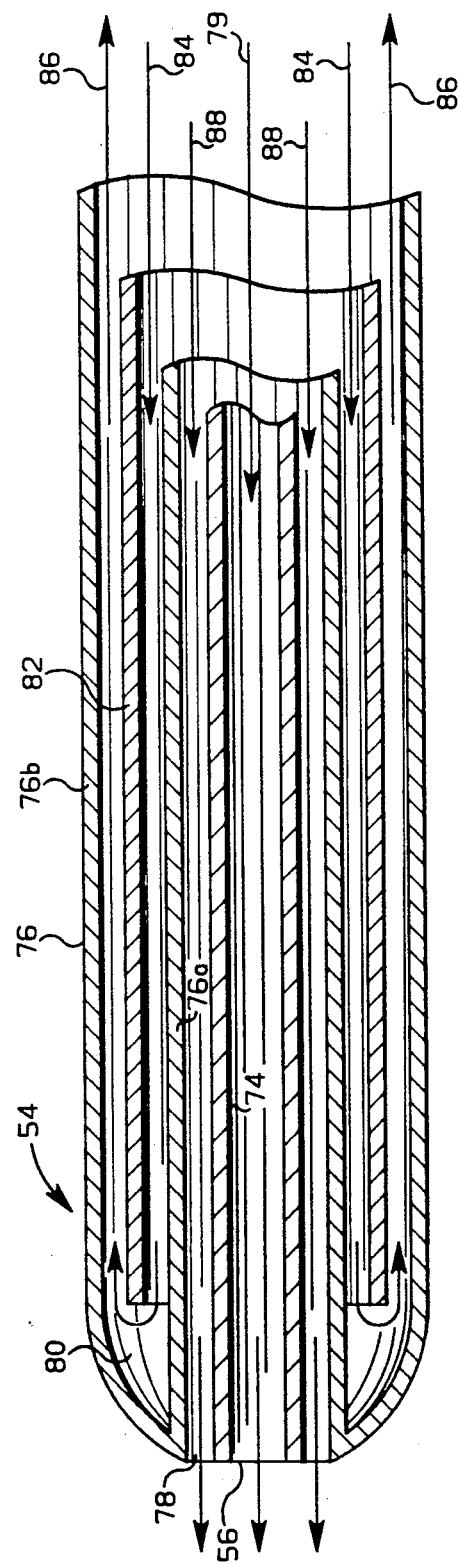

SILICON NITRIDE PRODUCTS AND METHOD FOR THEIR PRODUCTION

BACKGROUND OF THE INVENTION

This invention relates to a method and apparatus for producing nitride products, such as silicon nitride. In another aspect, the invention relates to the composition of such nitride products.

Various nitride powders, such as silicon nitride, are useful as advanced ceramic materials in the fabrication of highly stressed, wear resistant ceramic parts, such as those employed in heat engines, turbo-charger rotors and heat exchangers. Powders which are used to make such parts must meet stringent particle size (i.e. submicron) and purity requirements. New synthesis methods currently being researched, involving plasma and laser heating of gaseous reactants, for example, are effective in producing submicron, high purity nitride powders, but employ expensive equipment with high energy demands. Thus, these methods may not be practical for economical, large scale synthesis.

SUMMARY OF THE INVENTION

It is, therefore, an object of the invention to provide a method and apparatus which are economical in producing a highly pure nitride product composed of primarily submicron particles.

The above object is realized in a method which comprises: providing a reactor having a chamber defined therein which has longitudinally separated upstream and downstream ends, wherein the chamber comprises a combustion zone and a reaction zone such that the combustion zone extends from the upstream end to a boundary between the zones and such that the reaction zone extends from the boundary to the downstream end; establishing a flow of a combustible mixture in the combustion zone so as to generally flow in a direction toward the reaction zone, wherein the combustible mixture comprises a mixture of a fuel and an oxidant; combusting the combustible mixture in the combustion zone to produce hot combustion products; injecting at the boundary between the zones at least one reactant such that the hot combustion products carry the reactant(s) toward said downstream end, wherein the temperature in at least a portion of the reaction zone is at least about 1300° C. and wherein the elemental molar ratio of carbon to oxygen for the combination of the combustible mixture and reactant(s) is at least about 0.7:1, and wherein the reactant(s) is capable of reacting in the reaction zone to form a nitride compound; whereby a product powder comprising the nitride compound is produced in the reaction zone.

According to another aspect of the invention, an apparatus is provided which comprises: a reactor having a chamber defined therein which has an upstream end and a downstream end; a first nozzle which has an outlet end which communicates with the chamber at a position intermediate the upstream and downstream ends and which comprises first and second tubular members, wherein the first tubular member is generally coaxially positioned within the second tubular member such that a generally annular space is defined between the interior surface of the second tubular member and the exterior surface of the first tubular member; means for passing at least one reactant through the first tubular member so as to exit the first tubular member into the chamber, wherein the reactant(s) is capable of reacting in the reactor chamber to form a nitride product; means for passing a gas through the generally annular space so as to exit the first nozzle and generally surround the reactant(s) flowing from the outlet end of the first nozzle; a second nozzle having an outlet end which communicates with the chamber at a position closely adjacent to the upstream end; and means for passing a combustible mixture through the second nozzle so as to exit its outlet end into the chamber.

According to yet another aspect of the invention, there is provided a raw product as collected directly from the above-mentioned reactor (where a reactant includes a silicon component) which comprises silicon nitride and which is characterized by the following weight percentages: silicon in the amount of about 40 weight percent to about 75 weight percent; nitrogen in the amount of about 10 weight percent to about 40 weight percent; carbon in the amount of about 1 weight percent to about 10 weight percent; and oxygen in the amount of about 1 weight percent to about 30 weight percent. Such raw product which has a relatively high oxygen content of about 5 weight percent to about 15 weight percent is sinterable to a ceramic part having a high density of at least about 2.7 g/cc. Purification of the raw product by subsequent processing produces an extremely pure silicon nitride product. The product in accordance with the invention is composed of primarily submicron particles containing a very low level of impurities as will be discussed in more detail in the Detailed Description.

The method and apparatus of the invention are economical in requiring the use of inexpensive combustible fuels as the heating sources and in requiring a minimal investment for construction of the reactor. Therefore, the invention is particularly well suited to large scale synthesis of high quality nitride products.

BRIEF DESCRIPTION OF THE DRAWINGS

FIGS. 2 and 3 are enlarged cross-sectional views of nozzles which are shown in FIG. 1.

DETAILED DESCRIPTION OF THE INVENTION

A preferred embodiment of the invention will now be described with reference to the drawings.

Figure 1:
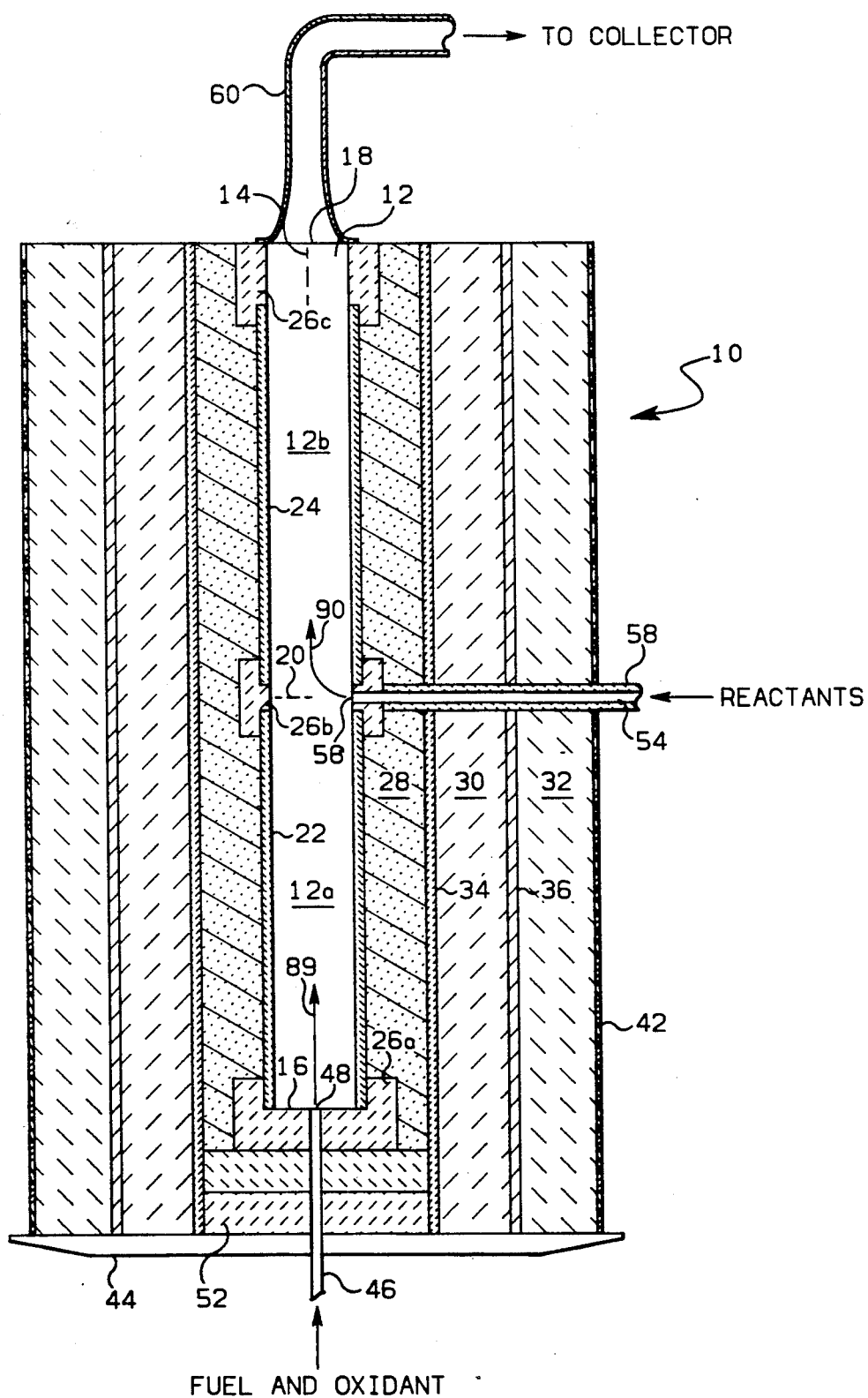
FIG. 1 is a cross-sectional view of a reactor in accordance with a preferred embodiment of the invention.

Referring to FIG. 1, there is shown a cross-sectional view of a reactor 10 having defined therein a chamber 12 which has a longitudinal axis 14 and longitudinally separated upstream and downstream ends 16 and 18 respectively. Chamber 12 includes a combustion zone 12a and a reaction zone 12b situated such that combustion zone 12a extends from upstream end 16 to an imaginary boundary 20 between the zones and such that the reaction zone 12b extends from boundary 20 to downstream end 18.

Chamber 12 is defined by refractory tubes 22 and 24 and also inserts 26a, b and c. Such tubes and inserts are preferably composed of a refractory material resistant to temperatures of at least 2000° C., such as zirconia, which is commercially available from Zircoa Products of Solon, OH.

As shown, there is provided several additional coaxially positioned layers of refractory material which are generally annular in shape and which surround tubes 22 and 24, including: layer 28, preferably comprising zirconia powder insulation, available from Zircar Products of Florida, NY, which allows for contraction and expansion of this layer; layer 30, which preferably comprises alumina-silica blanket insulation, commercially available under the trademark Fiberfrax ® from Carborundum of Niagara Falls, NY; and layer 32, which may be of the same composition as layer 30. A refractory cylinder 34, preferably low density thermal insulating alumina available from Zircar Products, is illustrated as separating layers 28 and 30, and a metal cylinder 36 most preferably composed of stainless steel separates layers 30 and 32. Cylinders 34 and 36 assist in providing structural support for the reactor.

The outermost refractory layer 32 is held in place by a cloth material 42, such as fiberglass, which wraps around the exterior surface of layer 32. The bottom end of the various layers are supported by a metal plate 44. The reactor is preferably oriented vertically as shown for the sake of operating convenience. If any of the refractory material breaks or cracks it tends to stay in position if the various layers and tubes are vertically positioned. Therefore, operation can sometimes continue despite such structural defects. Other reactor orientations are within the scope of the invention.

Nozzle 46 is connected to a source of fuel and oxidant and has an outlet end 48 which communicates with the combustion zone 12a of chamber 12 at a position closely adjacent to upstream end 16 of chamber 12. As shown, nozzle 46 is surrounded by refractory inserts 52 positioned near upstream end 16. Nozzle 54 is connected to a source of reactants, discussed later in detail, and extends through the various refractory layers to an outlet end 56 which communicates with chamber 12 at boundary 20 intermediate upstream and downstream ends 16 and 18. Nozzle 54 is surrounded by a refractory tube 58.

Proper positioning of the nozzles with respect to each other is an important consideration in optimizing operating efficiency and quality of the product. It is desirable for example to position nozzle 54 far enough downstream so that substantially all of the free oxygen has reacted with the fuel to form combustion products. Such positioning of the nozzles means that there is substantially no free oxygen ($O_2$ in its free gaseous state, uncombined with any other component) at boundary 20, thus avoiding the undesirable oxidation of one of the reactants, as will be discussed further in connection with operation of the apparatus. It is furthermore desirable to position nozzle 54 sufficiently downstream from nozzle 46 to avoid the jet pump effect on gases flowing from nozzle 46. This effect tends to pull the reactants upstream rather than the intended downstream flow. However, in addition to the above considerations, nozzle 54 should be positioned sufficiently upstream to ensure that temperatures to which the reactants are exposed are conducive to the formation of nitride product.

Also shown in FIG. 1 is conduit 60 which is connected at one end to reactor 10 so as to communicate with the downstream end 18 of chamber 12. Conduit 60 receives nitride product powder therethrough which then passes to a suitable collector, discussed further below. Conduit 60 in the illustrated embodiment not only functions to transport the product to the collector, but also functions as a heat exchanger. The outside of conduit 60 is exposed to a cooling means such as ambient air which allows heat transfer via both natural convection and radiation. Such heat transfer effects cooling of the product powder as it flows through conduit 60, which is highly desirable in order to prevent undesirable reactions involving, for example, oxidation of the nitride product to form unwanted oxides. In addition, such cooling of the product powder is desirable to prevent damage to the collector from excessively hot product. In instances where a cloth filter bag is used as the collector, conduit 60 should be of sufficient length to cool the product powder to a desired temperature, typically below about 100° C., before it enters the collector. Other types of collectors require less cooling. If desired, the cooling effect can be further enhanced by surrounding conduit 60 with a cooling coil or jacket having coolant fluid flowing therethrough.

With respect to materials for conduit 60, it is preferable that a non-metallic material be employed which will not add any undesirable metal contaminants to the product. If the desired product is silicon nitride for example, quartz (silicon dioxide) is preferred since molecular structures characterized by silicon-oxygen bonds are already present in the reactor product such that no essentially additional contaminants will enter the product stream. Quartz is also a particularly preferred material because of its high emissivity and excellent thermal shock resistance. However, other heat exchange materials, including metals, are within the scope of certain aspects of the invention.

The collector can be any suitable means of collecting the product powder. One suitable collector comprises a cloth filter bag connected to the downstream end of conduit 60. Other suitable collectors include metal filters, electrostatic precipitators or cyclone separators. Of course, regardless of what type of collector is used a pressure differential should preferably be established, by a suitable pump, across the collector to draw the product powder through conduit 60 and into the collector.

Referring to FIG. 2, there is shown a cross-sectional view of a portion of nozzle 46 having outlet end 48. Nozzle 46 comprises a tubular member 62, preferably constructed of a metal such as stainless steel, which has an inner sidewall 62a and an outer sidewall 62b. Such sidewalls define a generally annular space 64 therebetween which is connected to a source of coolant fluid such as water or ethylene glycol or a combination thereof, which could also include minor amounts of additives such as corrosion inhibitors, etc. if desired. A tubular member 66 is positioned within annular space 64 so as to generally divide the space into entrance and exit passageways for the coolant fluid. As shown, coolant fluid flows toward the tip of nozzle 46 as indicated at 68, and flows away from the tip in the opposite direction as indicated at 70. The direction of coolant fluid flow may be reversed if desired. The flow of coolant fluid through space 64 assists in preventing melting of the metallic tubular members, and also assists in preventing the flame from burning back (flashback) into nozzle 46 by keeping the interior of nozzle 46 below the autoignition temperature of the fuel/oxidant mixture. The interior of nozzle 46 is connected to a source of fuel and oxidant such that a flow of the fuel/oxidant mixture is established through nozzle 46 as indicated at 72.

Referring to FIG. 3, there is shown a cross-sectional view of nozzle 54 having outlet end 56. Nozzle 54 is preferably constructed of the same or similar metallic material as that used for nozzle 46, and includes tubular members 74 and 76. As shown, tubular member 74 is positioned generally coaxially within tubular member 76 such that a generally annular space 78 is defined between the interior surface of member 76 and the exterior surface of member 74. The interior of tubular member 74 is connected to a source of reactants to provide a flow of reactants therethrough as indicated at 79. Tubular member 76 is generally of the same design as member 62 in FIG. 2, and includes respective inner and outer sidewalls 76a and 76b between which there is defined a generally annular space 80. A tubular member 82 is positioned within annular space 80 so as to divide it into entrance and exit passageways. Space 80 is connected to a source of coolant fluid so as to establish respective entrance and exit flow paths 84 and 86. The reverse direction of coolant fluid flow can be employed if desired. The flow of coolant fluid not only assists in preventing melting of the metallic tubular members, but also helps prevent the formation of nitride deposits within nozzle 54 by maintaining the temperature of the nozzle below temperature limits conducive to nitride formation. This avoids the need to periodically clean nitride deposits from nozzle surfaces.

Annular space 78 is connected to a purge gas source to establish a flow of such purge gas through annular space 78 in the direction of outlet end 56, as indicated at 88. Thus, this flow of purge gas exits outlet end 56 in a generally annular stream so as to surround the reactants as they exit the nozzle. This annular gas stream forms a sheath around the reactants so as to prevent contact of the hot combustion gases in chamber 12 (see FIG. 1) with the reactants immediately after their exit from nozzle 54, thereby preventing the formation of nitride deposits on the tip of nozzle 54. Such deposits, if not prevented, can eventually lead to blockage of reactant flow from nozzle 54 and consequent reactor shutdown. Of course, the insulative sheath of purge gas disperses after only a few milliseconds, but this is sufficient time to allow the reactants to flow far enough away from the nozzle tip to prevent formation of undesirable deposits. The choice of purge gas is not critical, and can be, for example, an inert gas (i.e. argon or helium), a cooled waste gas as discharged by the reactor, or a reactive nitrogen-containing gas (i.e. ammonia) which can contribute nitrogen to the reactive stream for formation of nitrides.

The various gas flows are preferably established and controlled by conventional equipment not shown in the drawings. Gas can be supplied by, for example, pressurized gas bottles. The gas can pass from such a pressurized container and through an orifice plate whose orifice is sized to achieve sonic velocity of the gas. Such a sonic velocity prevents pressure disturbances from traveling upstream, so that whatever happens downstream near the reactor will not affect the desired flow rate of gas. A pressure regulator can be employed to control the rate of flow of the gas.

Turning now to another aspect of the invention, there is provided a method of making a nitride compound using the above described apparatus. Reference will be made to the drawings in describing a preferred embodiment of this method.

As used herein and in the appended claims, a nitride compound is defined as a binary compound of a first elemental component and a second, nitrogen component. Generally speaking, a nitride compound is produced in accordance with the illustrated embodiment by reacting two reactants. The first reactant contains the first component whereas the second reactant contains the second, nitrogen component.

According to certain broad aspects of the invention, the first component as contained in the first reactant may be any element capable of combining with nitrogen to form a nitride compound. For example, the first component may be a metal such as aluminum, tungsten, chromium, titanium, zirconium or molybdenum. Halides of such metals are particularly suitable as the first reactant. Or, the first component may be a metalloid such as silicon or boron. As stated previously, silicon nitride is a very useful nitride compound. Ceramic parts can be made from silicon nitride powder which have excellent mechanical strength and heat resistance. Therefore, reactants having silicon as the first component are of particular interest in connection with the present invention.

Preferred silicon-containing reactants which are compounds of silicon include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane $((CH_3)SiH_3)$, dimethylsilane $((CH_3)_2SiH_2)$, trimethylsilane $((CH_3)_3SiH)$ and tetramethylsilane $(Si(CH_3)_4)$; halogenated silanes such as dichlorosilane $(H_2SiCl_2)$; halogenated methylsilanes such as trimethyl silicon bromide $((CH_3)_3SiBr)$ and dichlorodimethylsilane $((CH_3)_2SiCl_2)$; siloxanes such as hexamethyldisiloxane $((CH_3)_3SiOSi(CH_3)_3)$; silazanes such as hexamethyldisilazane $((CH_3)_3SiNHSi(CH_3)_3)$; and silicon halides, such as silicon tetrachloride ($SiCl_4$). Cyclic and polymeric silicon compounds are also within the scope of the invention. If desired, mixtures of any of the preceding silicon-containing reactants can be employed. Silane is the presently preferred silicon-containing reactant in view of the quality of the product.

The second, nitrogen-containing reactant is preferably a hydronitride such as ammonia ($NH_3$), which is presently preferred, or hydrazine ($N_2H_4$). Although hydronitrides are preferred, any nitrogen-containing reactant capable of reacting with the first reactant to form nitride products is within the scope of certain aspects of the invention. Additional examples of suitable nitrogen-containing reactants include, for example, amines and nitrogen halides such as $NCl_3$.

The fuel, which is injected through nozzle 46, is preferably an unsaturated hydrocarbon (having at least one double or triple bond between carbon atoms), such as, for example, ethylene, propylene, butene, propadiene, butadiene, acetylene, propyne, butyne and mixtures thereof. Another preferred group of hydrocarbon fuels are cyclic hydrocarbons such as cyclopropane, cyclobutane, and mixtures thereof. Other types of fuels, such as solid fuels substantially comprising pure carbon, and fuel blends are within the scope of certain aspects of the invention as long as the desired temperature conditions and carbon to oxygen ratio, later discussed, are achieved in the reactor.

The oxidant employed should be capable of accepting electrons from the fuel and is preferably an oxygen-containing gas, most preferably pure oxygen. Gaseous mixtures which include oxygen as a single component, such as air, are within the scope of the invention.

In accordance with a preferred procedure for operating the illustrated apparatus, flow of coolant fluid is started with respect to nozzles 46 and 54, followed by gradual heating of the reactor to normal operating temperatures. This is done to avoid thermal shock and possible breakage to the various refractory materials. One method for this preheating stage involves initial electrical heating of the refractory layers with electrical rod heaters (not shown) and heating of chamber 12 with a coiled wire electrical heater (not shown) inserted into chamber 12, followed by establishment of a combustion flame in combustion zone 12a.

In any event, the combustion flame is established in combustion zone 12a by initiating a flow of gaseous fuel through nozzle 46. If the reactor has been preheated electrically, the fuel should spontaneously establish a flame by reacting with ambient air at downstream end 18 of chamber 12. If the combustion flame does not form, the fuel may be ignited with an appropriate ignition device. After the flame is established, a flow of air is initiated through nozzle 46 so as to produce a fuel/air mixture. This causes the flame to propagate upstream so that the flame establishes itself in combustion zone 12a. Propagation of the flame in this manner can be hazardous to an operator implementing the method such that adequate safety precautions are taken. The reactor is typically operated with this fuel/air mixture for a predetermined period, usually ½ hour to 1 hour. Operation of the reactor with air as the oxidant is part of the preliminary start-up of the reactor to gradually heat the reactor.

A flow of pure oxygen is now commenced through nozzle 46 to replace the air. The flow of such oxygen is gradually increased and the flow of air gradually decreased until a fuel/oxygen combustible mixture is obtained. The combustion flame should be monitored visually through downstream end 18 to make sure that the flame does not flash back upstream so as to enter the nozzle 46 and cause a potentially dangerous condition. Flashback can be prevented by providing a sufficiently high velocity of fuel and oxygen exiting nozzle 46.

A flow of the fuel/oxygen mixture is thus established in a direction generally parallel to axis 14 as indicated at 89, and the fuel and oxygen flow rates are set to be relatively fuel-rich in preparation for nitride production. Preferably, the elemental molar ratio of carbon to oxygen for the fuel/oxygen mixture is at least about 0.7:1, more preferably in the range of about 0.8:1 to about 1.2:1, and most preferably in the range of about 0.9:1 to about 1.1:1. As used herein, the elemental molar ratio of carbon to oxygen means the molar ratio of carbon atoms to oxygen atoms. The residence time of the combustible mixture and hot combustion products formed therefrom in combustion zone 12a is typically about 5 to about 20 milliseconds, which is sufficient time to consume substantially all of the oxygen before reaching boundary 20. Temperature conditions in combustion zone 12a are typically about 1700° C. to about 2000° C.

The gaseous reactants are now injected into chamber 12 at boundary 20, as indicated at 90, in a direction generally perpendicular to the chamber axis 14 such that the hot combustion products formed from combustion of the fuel carry the reactants toward downstream end 18. In the illustrated embodiment, the first and second reactants are premixed to give a desired molar ratio of silicon to nitrogen in the reactants of typically about 1:2 to about 1:4 and passed in admixture through nozzle 54 so as to exit outlet end 56 into chamber 12. If the first reactant employed is normally a liquid, such first reactant is placed in vapor form most conveniently by placing it in a bubbler and passing a purge gas therethrough. The temperature of the coolant fluid flowing through nozzle 54 can be elevated to the necessary extent to help prevent condensation of the first reactant as it passes through nozzle 54.

Flow rates are adjusted so that the elemental molar ratio of carbon to oxygen for the combination of the reactants and fuel/oxygen mixture (overall ratio) is at least about 0.7:1, preferably about 0.8:1 to about 1.2:1, and most preferably about 0.9:1 to about 1.1:1. It may be noted that the above ratio ranges are the same as those cited previously for the fuel/oxygen mixture only (combustion ratio). This is because no additional carbon or oxygen is needed in the reaction zone to form silicon nitride. It should be noted, however, that the use of certain silicon-containing reactants having carbon and/or oxygen therein (i.e. alkyl silanes, siloxanes, etc.), which are within the scope of certain aspects of the invention, will make the overall carbon to oxygen ratio slightly different from the combustion ratio. A carbon to oxygen ratio in the above cited ranges is desirable to produce a reducing atmosphere of carbon monoxide and hydrogen, rather than oxidizing species like carbon dioxide and water, which is believed to be conductive to the formation of nitrides instead of unwanted oxides. Employing a combustion ratio within the cited ranges as well as an overall ratio within these ranges particularly enhances conditions favorable to the production of nitrides.

Temperature conditions for at least a portion of reaction zone 12b are at least about 1300° C., preferably in the range of about 1300° C. to about 1700° C., most preferably in the range of about 1400° C. to about 1600° C. If temperatures at the upper end of these ranges are desired, a preferred fuel is acetylene or a mixture of acetylene and ethylene. This is particularly desirable where the first reactant is, for example, a chlorinated silane such as dichlorodimethylsilane, which requires a higher temperature than some other reactants to achieve a desirable reaction rate to form silicon nitride and other products. The temperature conditions in the reactor can most conveniently be monitored by means of a thermocouple (not shown) positioned in one of the refractory layers. The temperature detected by the thermocouple can be correlated to actual temperature conditions in the reactor. Of course, a thermocouple can be positioned directly in the chamber 12, but this requires use of expensive materials such as platinum and/or rhodium which are still subject to deterioration due to the high temperatures in chamber 12.

Pressure conditions in reaction zone 12b are preferably at or near atmospheric pressure. Other operating pressures are within the scope of the invention.

In reaction zone 12b, a product powder is formed from the reactants which includes the desired nitride compound and other components as is discussed further below. The product powder exits the reactor through downstream end 18 and passes into and through conduit 60 to the collector. After the desired amount of product powder is collected, the reactor is shut down by first switching to air as the oxidant and then gradually decreasing the fuel/oxidant flow rates to provide gradual cooling of the reactor. It is sometimes desirable to run the reactor before shutdown for a period of time, i.e. 15 minutes, at full flow rates to burn out carbon deposits. After shutdown, the reactor is typically allowed to cool for several hours before the supply of coolant fluid to the nozzles is terminated.

In the following description of products produced in accordance with the invention and in claims appended hereto, it is to be understood that the term "weight percent" as applied to a component of a composition is based on the total weight of the composition.

The product powder as collected directly from the reactor, hereafter denoted as "raw" powder, is generally tan or white in appearance, and in the case of silicon as the first component, contains silicon nitride, silicon in addition to that in the silicon nitride, carbon, and oxygen. Such a raw product powder is characterized by the following weight percentages: silicon in the amount of about 40 to about 75 weight percent, preferably in the amount of about 50 to about 70 weight percent, and most preferably in the amount of about 55 weight percent to about 65 weight percent; nitrogen in the amount of about 10 to about 40 weight percent, preferably in the amount of about 15 to about 35 weight percent, and most preferably in the amount of about 25 to about 35 weight percent; carbon in the amount of about 1 to about 10 weight percent, preferably in the amount of about 1 to about 6 weight percent, and most preferably in the amount of about 1 to about 3 weight percent; and oxygen in the amount of about 1 to about 30 weight percent, preferably in the amount of about 1 to about 20 weight percent, and most preferably in the amount of about 1 to about 15 weight percent. Hydrogen can also be present in the raw product in minor but detectable amounts of between 0 and about 1 weight percent.

The raw product powder in accordance with the invention can be further characterized insofar as a sample of such powder having a relatively high oxygen content in the range of about 5 to about 15 weight percent is sinterable to a ceramic part having a density of at least about 2.7 g/cc, or about 85% of the density of pure crystalline silicon nitride, by a process comprising: pressing the raw product to a pressed ceramic part; heating the pressed part to a temperature of about 1500° C. to about 1900° C. without application of compaction force so as to produce the sintered part having the density of at least about 2.7 g/cc; wherein no steps are performed prior to the heating step for removal of any appreciable amounts of oxygen from the raw product or pressed part produced therefrom. As used herein and in the appended claims, the term "pressing" refers to any technique for fabricating a self-supporting shape from ceramic particles. Also as used herein and in the appended claims, the application of a "compaction force" to a ceramic part means the application of a force to the part by means of a solid member in contact with the part which mechanically compacts the part to thereby increase its density.

X-ray fluorescence analysis of the raw product indicates that the product has less than about 500 ppm of elemental impurities, wherein such elemental impurities include aluminum and those elements of higher atomic numbers, except silicon, up to and including uranium. Many of these impurities undesirably decrease the strength of the sintered nitride parts made from product powder.

Individual particles of the raw product are highly uniform and have diameters which range from about 0.01 to about 0.5 micron. Submicron and uniform particles are important characteristics in the production of fine-grained, high strength parts from a nitride powder.

The raw product powder can be further purified by additional processing to yield a purified product with higher crystallinity. This purification process typically involves two stages carried out in a conventional furnace. First, the raw powder is heated in the presence of a nitrogen-containing gas such as pure nitrogen gas at a temperature of about 1300° C. to about 1900° C. and most preferably at about 1400° C. to about 1700° C. for at least about 15 minutes and most preferably for about 1 to about 2 hours. This serves to react molecular structures having silicon-oxygen bonds with carbon to thereby remove oxygen as carbon monoxide and make the silicon available for reacting with the nitrogen-containing gas to form additional silicon nitride. Typically, the raw powder has insufficient carbon to remove a substantial portion of the oxygen, thus necessitating the addition of carbon to the raw powder before heating in the nitrogen-containing gas. Second, the powder resulting from the first purification stage is heated in an oxygen-containing atmosphere to a temperature of about 600° C. to about 900° C. and most preferably at about 600° C. to about 700° C. over a period of about at least about 15 minutes and most preferably for about 30 minutes to about 2 hours. This stage burns off remaining carbon as carbon oxides to yield a highly pure product.

Individual particles of the purified product in the form of a powder have diameters which range from about 0.1 micron to about 10 microns. The purified product is characterized, however, by a substantial portion of the particles having diameters of 1 micron and less.

Either the raw or purified product can be sintered into heat resistant, high strength parts in a conventional manner. For example, appropriate amounts of additives such as yttrium oxide and aluminum oxide can be added to the product, followed by pressing of the product to a desired shape and heating at a temperature of about 1500° C. to about 1900° C.

It is to be understood that the above description pertains to a preferred embodiment of the invention, but that many variations and modifications are within the scope of certain aspects of the invention. For example, it is possible to use nitrogen from the first reactant (i.e. a silazane) or nitrogen produced in the combustion zone as the source of nitrogen for producing the nitride compound, in which case the second, nitrogen-containing reactant could be omitted. It is desirable in such an embodiment to utilize a carrier gas, such as helium, argon, hydrogen, carbon monoxide or mixtures thereof, in admixture with the first reactant to carry it into the reactor chamber. Since a mixture of carbon monoxide and hydrogen is produced as a waste gas by the reactor, the reactor can serve as a convenient source of such carrier gas. Another possible variation could involve employing a fuel which includes a preferred unsaturated hydrocarbon as well as amounts of other types of hydrocarbons such as saturated hydrocarbons. However, this will generally decrease the heat produced by the combustion reaction so as to possibly require a supplemental heat source (i.e. electric, plasma, microwave, combustion zones exterior to chamber 12 but in heat exchange relationship with chamber 12, etc.) to obtain the desired temperature conditions in the reaction zone. In any event, it is preferable that the hot combustion products as produced by combustion in the combustion zone provide at least about 15% of the energy needed to maintain desired temperature conditions of at least about 1300° C. in the reaction zone.

EXAMPLES

Specific examples will now be described to further illustrate the invention. These examples should not be construed to limit the invention in any manner.

In each of the following examples, various gaseous flow rates are given in gram moles/minute (abbreviated to gmoles/min hereafter). Actual measurements of flow rate were taken volumetrically at room temperature and atmospheric pressure in units of liters/minute. These volumetric measurements were converted to gmoles/min by assuming there are 24.45 liters/mole for any gas at 25° C. (room temperature) and at atmospheric pressure. All flow rates for gases below are undiluted with any other gases (i.e. carrier gases) unless specified otherwise.

With respect to carbon to oxygen ratios specified in the following examples, Examples I—III employ reactants having carbon and/or oxygen therein, such that both a combustion (comb.) C:O ratio for the fuel/oxidant mixture only and an overall C:O ratio for the combination of the fuel/oxidant mixture and reactants are given. In Examples IV-VII, only one C:O ratio is given since the reactants contain no oxygen or carbon. Thus the C:O combustion and overall ratios for these examples are identical.

Unless noted otherwise, the fuel in each example was a mixture of 20 vol. percent acetylene and 80 vol. percent ethylene, and the oxidant employed was pure oxygen at a flow rate of 1.09 gmoles/min.

A flow of water was maintained around the reactor nozzles during operation of the reactor in each example for the purpose of cooling the nozzles.

With respect to elemental analysis results given in various tables, the carbon, hydrogen and nitrogen weight percentages were obtained by means of CHNS combustion analysis. The Si percentages were obtained using either neutron activation or X-ray fluorescence analysis techniques. In the following examples, an n will indicate a silicon weight percentage to have been determined by neutron activation and an x will indicate X-ray fluorescence. The oxygen percentages were obtained using only neutron activation.

In several examples, the weight percentages obtained from elemental analysis sum to a total percentage of greater than 100% which might be considered an unreasonably high value. It was found in this regard that at least some of this error may have been contributed by the results of neutron activation analysis for silicon and oxygen. The neutron activation instrument was calibrated with an analytical standard sample of silicon dioxide (Puratronic grade, Johnson Matthey Chemical Ltd., Herts, England). The results of such analysis favorably compared to the actual weight percentages of silicon and oxygen in the standard sample. Therefore, every possible effort was made to produce accurate neutron activation analysis results for silicon and oxygen. After noting consistently high (i.e. greater than 100%) total weight percentage results in analyzing products of the invention, a series of samples were analyzed for silicon by both neutron activation and X-ray fluorescence. The neutron activation analysis always yielded a weight percentage of silicon slightly greater than that weight percentage obtained by X-ray fluorescence analysis of the same sample.

In each example where an elemental analysis was performed, CHNS analysis revealed detectable amounts of hydrogen. However, hydrogen weight percentages of less than 1 weight percent are not reported in the following examples.

With respect to terminology and notations used hereafter, it will be understood that all degree readings obtained by X-ray diffraction are for an angle of $2\theta$. In addition, the notation Si—O means silicon bonded to oxygen but denotes no particular molecular structure.

EXAMPLE I

The purpose of this example is to demonstrate the preparation of silicon nitride using hexamethyldisilazane and ammonia as reactants.

The sample prepared in this example was prepared using a reactor which is described below.

The reactor was substantially similar to that shown in FIGS. 1, 2 and 3. Instead of having only one sidestream nozzle 54 as shown in FIG. 1, the reactor used in this example had an additional opposing nozzle on the opposite side of chamber 12. A Dacron ® bag filter was utilized to collect product powder exiting from a quartz conduit having one end in communication with the downstream end of the reactor. Important dimensions of the reactor are given in the following table, Table IA, including dimensions of tubular members 74 and 76 of nozzle 54.

TABLE IA

| Reactor Dimensions | |
|---|---|
| Item | Dimension |
| Diameter of Chamber 12 | 5.08 cm |
| Overall length of Chamber 12 | 53.3 cm |
| Length of Combustion Zone 12a | 27.9 cm |
| Length of Reaction Zone 12b | 25.4 cm |
| Overall O.D. of Reactor 10 | 33.0 cm |
| O.D. of Tubular Member 76 | 0.952 cm |
| I.D. of Tubular Member 76 | 0.394 cm |
| O.D. of Tubular Member 74 | 0.317 cm |
| I.D. of Tubular Member 74 | 0.175 cm |

Dimensions of nozzle 46 are identical to those of nozzle 54, except with respect to tubular member 74. Of course, tubular member 46 does not have such an inner tubular member.

The hexamethyldisilazane, which is a liquid reactant at ambient conditions, was introduced to the reactor by placing the hexamethyldisilazane in a glass bubbler maintained at 80° C. and passing ammonia gas through the bubbler so that the ammonia gas was saturated with the hexamethyldisilazane vapor. In this case the feed lines extending from the bubbler to the reactor were heated to prevent condensation of the silicon feed. Ammonia was utilized as a purge gas so as to flow through annular space 78 (see FIG. 3) of each of the reactant sidestream nozzles at a flow rate of 0.042 gmoles/min per nozzle. The process conditions and elemental analysis of the raw reactor product are presented in Table IB. The sidestream ammonia flow rate refers to the total flow of ammonia from both sidestream nozzles. Such flow is through tubular member 74 (see FIG. 3). Such nomenclature with respect to sidestream flow of ammonia will also be assumed in subsequent examples.

the glass bubbler was maintained at 60° C. instead of 80° C. A reactor as described in Example I was operated at the conditions set forth in Table II to produce a raw reactor powder. A purge gas of ammonia was employed in conjunction with each nozzle at a flow rate of 0.10 gmoles/min. Table II also gives the results of elemental analysis of the raw product.

TABLE II

Use of Hexamethyldisiloxane and Ammonia to Produce Silicon Nitride

| | Carbon:Oxygen Ratio | | Fuel flow gmoles/min | Sidestream Flows | | Analysis | | | | |
|---|---|---|---|---|---|---|---|---|---|---|
| | | | | Hexamethyl-disiloxane gmoles/min | Ammonia gmoles/min | C | N | Si(n) | O | H |
| Run | Comb. | Overall | | | | | | Wt. percent | | |
| 2 | 1.04 | 1.14 | 1.12 | 0.047 | 0.127 | 5.2 | 15.0 | 43.9 | 28.7 | 1.40 |

TABLE IB

Use of Hexamethyldisilazane and Ammonia to Produce Silicon Nitride

| | Carbon:Oxygen Ratio | | Fuel flow gmoles/min | Sidestream Flows | | Analysis | | | |
|---|---|---|---|---|---|---|---|---|---|
| | | | | Hexamethyl-disilazene gmoles/min | Ammonia gmoles/min | C | N | Si(n) | O |
| Run | Comb. | Overall | | | | | Wt. percent | | |
| 1 | 1.04 | 1.12 | 1.12 | 0.034 | 0.088 | 3.66 | 23.1 | 54.1 | 26.4 |

Operation under the conditions summarized in Table IB was maintained for a period of 15 minutes. This resulted in collection of 33.8 g of raw product powder which had a B.E.T. surface area of 112 m$^2$/g.

Product analysis as summarized in Table IB reveals substantial weight percentages of silicon and nitrogen. This is taken to indicate the presence of silicon nitride. Considering other possible bonding of the nitrogen to other elements, nitrogen in combination with carbon or oxygen can generally form only gaseous compounds. Therefore, it is reasonable to assume that the nitrogen present in the solid product is bound to at least a portion of the silicon.

X-ray powder diffraction analysis of the raw product produced by run 1 resulted in a diffraction pattern having two very broad peaks at an angle between 20° and 40° and between 60° and 80°, respectively. The broad peaks are taken to indicate the presence of poorly crystallized silicon nitride. Each of these broad peaks are believed to result from the overlapping of a plurality of peaks which characterize silicon nitride. This will become more apparent in a subsequent discussion of an X-ray diffraction pattern corresponding to a reference sample of crystalline silicon nitride.

EXAMPLE II

The purpose of this example is to demonstrate the preparation of silicon nitride from the reactants hexamethyldisiloxane and ammonia.

Hexamethyldisiloxane is a liquid reactant and was introduced to the reactor chamber 12 as a vapor using the same procedure described in Example I, except that An X-ray powder diffraction pattern corresponding to the raw product produced above revealed a broad peak between 20° and 40° which is taken to indicate the presence of silicon nitride. The above product analysis is also evidence of the presence of silicon nitride.

EXAMPLE III

The purpose of this example is to demonstrate the preparation of silicon nitride from tetramethylsilane and ammonia.

Tetramethylsilane is also normally in liquid form and was introduced to the reactor chamber using the procedure described in Example I. A reactor was employed as described in Example I. No purge gas was passed through the nozzles. The process conditions are set forth in Table III.

TABLE III

Use of Tetramethylsilane and Ammonia to Produce Silicon Nitride

| | Carbon:Oxygen Ratio | | Fuel flow gmoles/min | Sidestream Flows | | Analysis | | | |
|---|---|---|---|---|---|---|---|---|---|
| | | | | Tetra-methylsilane gmoles/min | Ammonia gmoles/min | C | N | Si(n) | O |
| Run | Comb. | Overall | | | | | Wt. percent | | |
| 3 | 1.04 | 1.14 | 1.12 | 0.064 | 0.22 | 5.20 | 26.2 | 54.4 | 16.4 |

Operation under the conditions summarized in Table III for a period of 6 minutes resulted in the collection of 12 grams of raw product powder which had a B.E.T. surface area of 102 m$^2$/g.

An X-ray powder diffraction pattern of the raw product reveals a prominent, broad peak between 20° and 40° and a less prominent peak between 60° and 80°. This together with the product analysis results is strong evidence of the presence of silicon nitride in the product.

EXAMPLE IV

The purpose of this example is to demonstrate the preparation of silicon nitride from silane and ammonia. This example will also set forth the results of various analysis of raw products in accordance with the invention which evidence the presence of silicon nitride in the raw products and the low level of impurities in such products.

Process conditions and product analysis for six different runs (runs 4–9) are set forth in Table IV. The reactor employed in run 4 was like that described in Example I except that the sidestream reactant nozzles did not include an annulus for receiving purge gas therethrough. Referring to FIG. 3, each such nozzle did not include tubular member 74, such that reactants were passed through the space defined by inner sidewall 76a of tubular member 76. The reactor employed in runs 5–9 was the reactor described in Example I. In each of runs 5–8, 0.15 g moles/min of helium purge gas was passed through each sidestream reactant nozzle. In run 9, ammonia was used as a purge gas at a flow rate of 0.15 g moles/min per nozzle. Since the silicon-containing reactant, silane, is a gas at ambient conditions, a glass bubbler was unnecessary in these runs.

Figure 5:
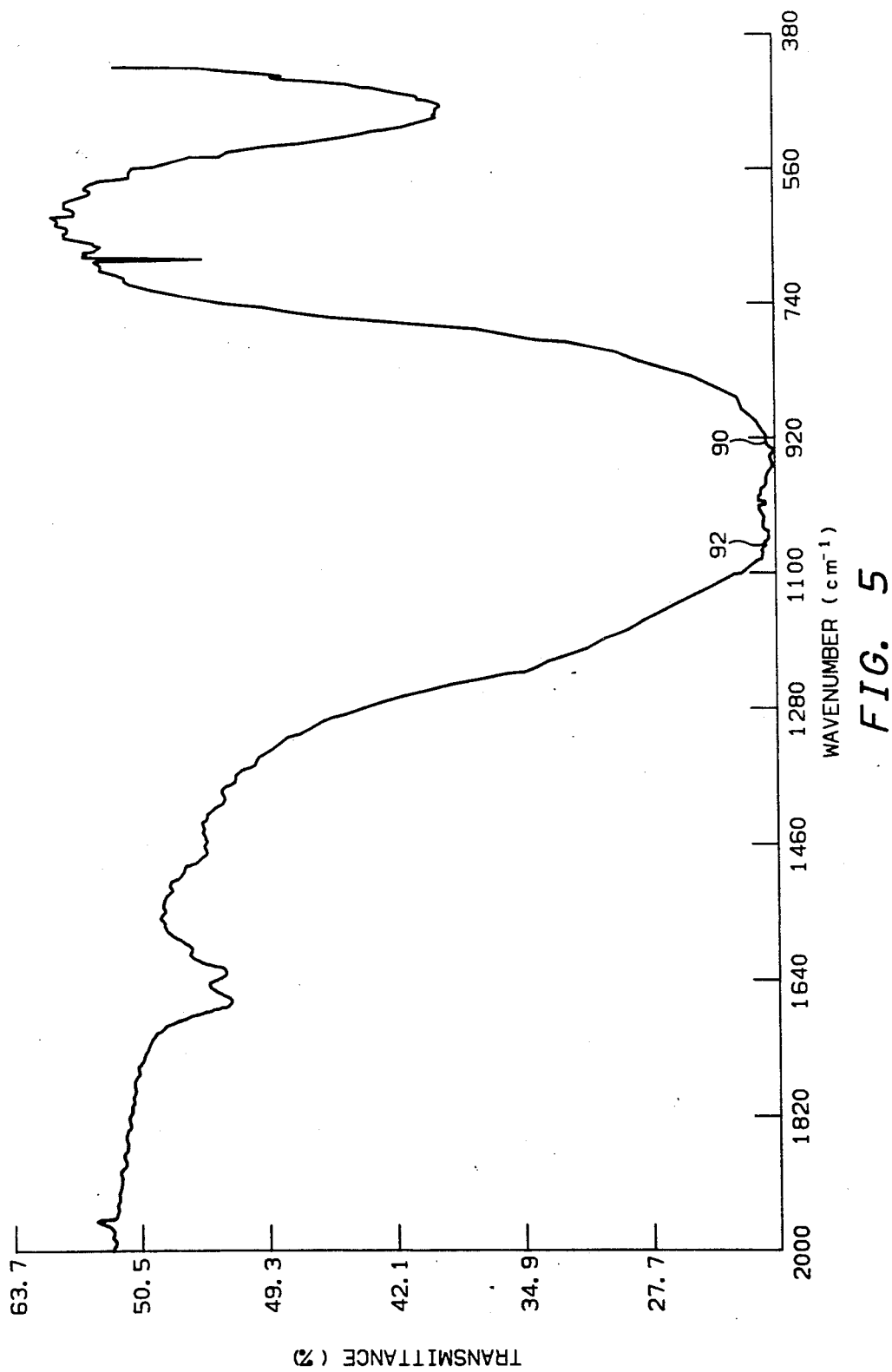
FIG. 5 is an infrared spectral pattern for a product produced in Example V.

The raw product powders resulting from runs 6, 7 and 8 were subjected to infrared absorption analysis. Each of the resulting infrared patterns, plotted as wavenumber versus transmittance, show a broad absorption between a wavenumber of about 920 and about 1100. With respect to the product from run 7, the corresponding infrared pattern is shown in FIG. 5. A reference standard silica ($SiO_2$) sample and a reference standard silicon nitride sample were separately analyzed via infrared absorption. Analysis revealed absorption at a wavenumber of around 1100 for silica and absorption at a wavenumber of about 920 for silicon nitride. Therefore, FIG. 5 is taken to indicate the presence of both silicon-oxygen bonds and silicon-nitrogen bonds in the product of run 7 as evidenced by overlapping absorptions at wavenumbers at about 1100 and about 920. Note also that the pattern of FIG. 5 has a "double band" structure. That is, the separate absorption bands for

TABLE IV

Use of Silane and Ammonia to Produce Silicon Nitride

| | | Sidestream Flows | | Analysis | | | |
|---|---|---|---|---|---|---|---|
| Run | Carbon:Oxygen Ratio | Fuel flow gmoles/min | Silane gmoles/min | Ammonia gmoles/min | C | N | Si | O |
| | | | | | | Wt. percent | | |
| 4 | 1.04 | 1.12 | 0.06 | 0.220 | 1.30 | 31.8 | 61.6(n) | 14.20 |
| 5 | 1.04 | 1.12 | 0.06 | 0.200 | 2.40 | 30.5 | 67.7(n) | 6.91 |
| 6 | 1.04 | 1.12 | 0.06 | 0.200 | 0.80 | 29.8 | 58.0(x) | 12.00 |
| 7 | 0.93 | 1.02 | 0.06 | 0.200 | 1.50 | 25.2 | 54.2(x) | 21.60 |
| 8 | 0.88 | 0.96 | 0.06 | 0.200 | 1.80 | 22.1 | 53.5(x) | 25.60 |
| 9 | 1.04 | 1.12 | 0.06 | 0.200 | 3.10 | 30.5 | 63.0(n) | 11.30 |

Collected product ranged from about 1.96 g product/run to about 2.27 g product/run with a B.E.T. determined surface area that ranged from about 84 m$^2$/g to about 114 m$^2$/g.

It can be seen from the product analysis of Table IV that each run produced a raw reactor product powder having substantial weight percentages of nitrogen and silicon, thus evidencing the presence of silicon nitride.

Further analysis of the different products was performed to further establish the presence of silicon nitride in the resulting products.

Figure 4:
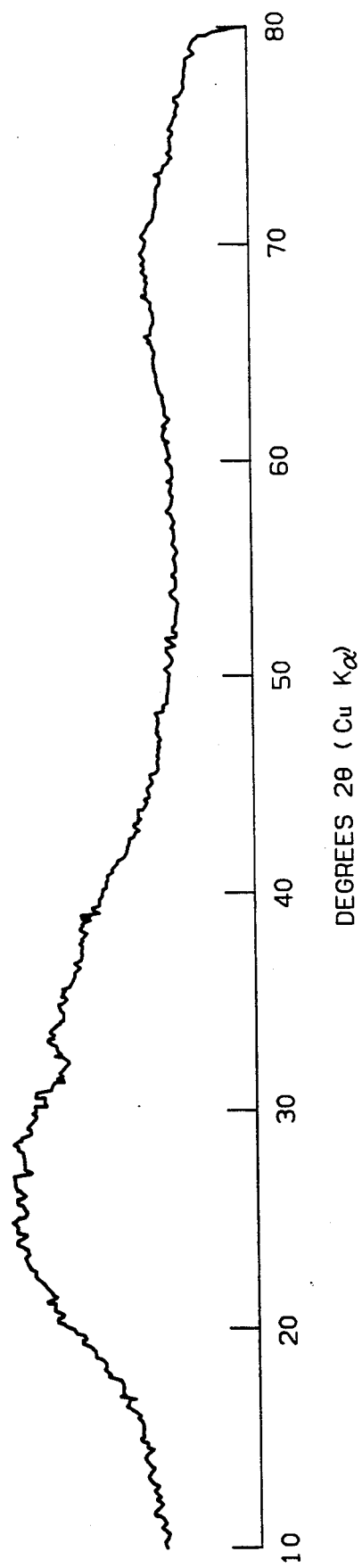
FIG. 4 is an X-ray diffraction pattern for a product produced in Example IV.

The products collected from runs 4 and 5 were subjected to X-ray powder diffraction analysis. The X-ray diffraction pattern for the run 4 product is shown in FIG. 4, and can be seen to have a prominent broad peak between about 20° and about 40°, and a less prominent peak between about 60° and about 80°. This pattern is fairly typical of X-ray diffraction patterns for low crystallinity raw products obtained in accordance with the invention, and is very similar to the pattern for the run 5 product, which is not shown.

The raw product from run 5 was further analyzed using X-ray fluorescence. A sample of the product was scanned for elemental impurities, where such impurities included aluminum and those elements of higher atomic number, except silicon, up to and including uranium. The only elemental impurities detected were calcium (40 ppm) and iron (130 ppm). Such a low level of elemental impurities contributes to the strength of a ceramic part sintered from the product.

silicon-nitrogen bonds and silicon-oxygen bonds are apparent as indicated at 90 and 92 respectively.

Figure 6:
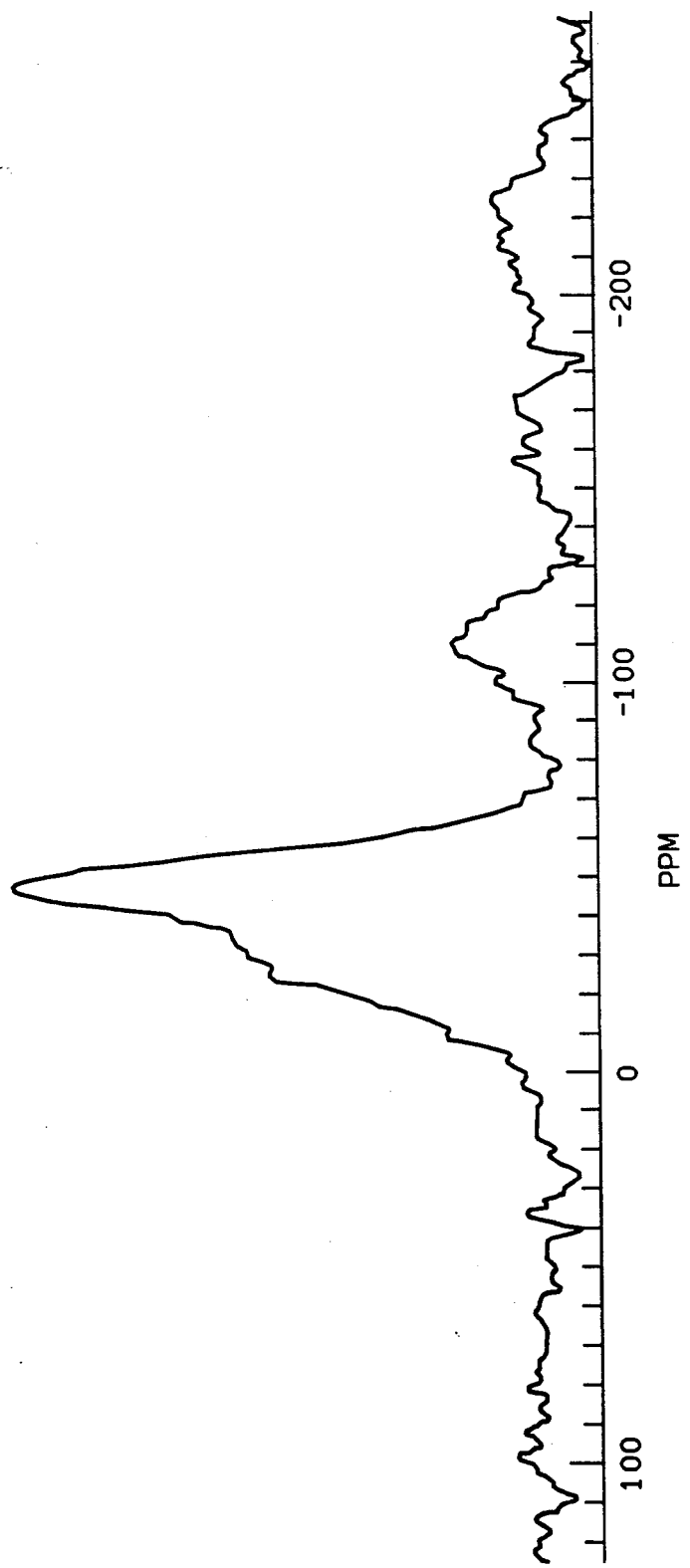
FIG. 6 is an NMR pattern for another product produced in Example V.

The product from run 9 was subjected to both X-ray diffraction and nuclear magnetic resonance (NMR) analysis. The X-ray diffraction pattern showed broad peaks between 20° and 40° and between 60° and 80°. With respect to the NMR analysis, the product was analyzed by silicon-29 nuclear magnetic resonance. The NMR spectrometer used was a model WPSY-200 available from Bruker Instruments. Since the material examined was a solid, the experimental determination utilized crossed polarization magic angle spinning. The resulting pattern, shown in FIG. 6, displays three resonances at −25, −48, and −110 ppm indicating silicon carbide, silicon nitride, and Si-O respectively. The linewidths for the silicon carbide and silicon nitride signals, which can be seen to overlap, indicates they are fairly amorphous.

EXAMPLE V

The purpose of this example is to demonstrate a representative particle size distribution from products produced by the invention and to demonstrate the production and analysis of a purified product.

The reactor of Example I was also employed in this example, using a flow of ammonia purge gas of 0.10 g moles/min through each sidestream reactant nozzle. The reactor processing conditions and product analysis are summarized in Table V.

TABLE V

Use of Silane and Ammonia to Produce Raw Product for Purification

| Run | Carbon:Oxygen Ratio | Fuel flow gmoles/min | Sidestream Silane | Flows Ammonia | C | N | Si(x) | O |
|---|---|---|---|---|---|---|---|---|
| | | | | | | Wt. percent | | |
| 10 | 1.04 | 1.12 | 0.06 | 0.14 | 2.3 | 32.3 | 57.5 | 11.2 |

The conditions summarized in Table V produced 215 g of raw product powder in 103 minutes of operation with a B.E.T. determined surface area of 118 m²/g.

Figure 7:
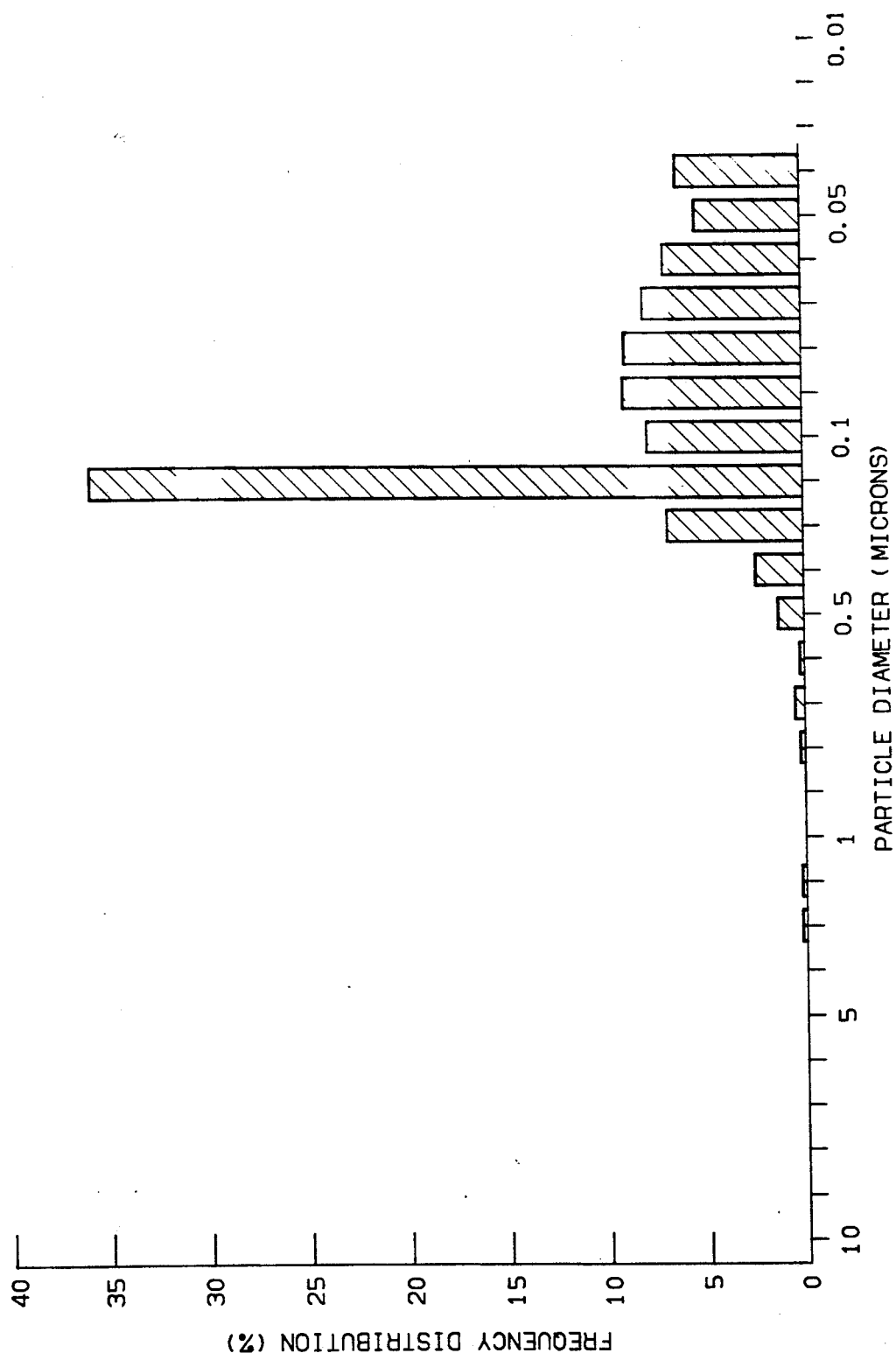
FIG. 7 is a graphical representation of the particle size distribution of a raw product collected directly from the reactor in Example V.

A particle size distribution of a sample of this product was obtained by analysis in a Horiba CAPA-700 Particle Analyzer after the sample had been ultrasonically dispersed in a dispersant comprising a 0.07 wt. % solution of Triton ® X100 (Rohm & Haas Company) in deionized water. The resulting particle size distribution was as follows wherein each percentage value is the percentage of particles examined falling in the indicated particle diameter range: 0.00 to 0.04 micron-6.3%; 0.04 to 0.05 micron-5.4%; 0.05 to 0.06 micron-7.0%; 0.06 to 0.07 micron-8.1%; 0.07 to 0.08 micron-9.0%; 0.08 to 0.09 micron-9.1%; 0.09 to 0.10 micron-7.9%; 0.1 to 0.2 micron-35.9%; 0.2 to 0.3 micron-7.0%; 0.3 to 0.4 micron-2.5%; 0.4 to 0.5 micron-1.4%. Several other particle diameter ranges had corresponding percentages of 1% or less which are essentially considered anamolies in the data. This data is illustrated in the bar graph of FIG. 7 in which individual bars represent particular particle diameter ranges recited above. Each bar is positioned at the particle diameter value which is the upper limit of a particular range. For example, the bar at 0.1 micron represents the 0.9 to 0.10 micron range.

Infrared analysis of the raw product resulted in a spectral pattern, plotted as wavenumber versus absorbance, having a broad prominent peak between wavenumbers of 800 and 1200, and a smaller peak between wavenumbers of about 400 and 600. Comparison of this spectral pattern to reference patterns published in the *Journal of Materials Research*, Volume 4, No. 2, pages 399–402, March 1989, indicates the product is either amorphous silicon nitride or alpha silicon nitride, or possibly a mixture thereof. The X-ray diffraction pattern of the product reveals at least a broad peak between 20° and 40°, thus indicating that the product is crystalline at least to some extent.

The raw product was treated to remove oxygen and carbon from the sample. To 3.0 grams of the raw product produced in this example was added 0.75 grams carbon black (grade FW 18, DeGussa Corp., Teterboro, N.J.) and the mixture milled. A fraction of the mixture, 3.60 g, was placed in a high purity graphite crucible which was then subsequently place in a controlled atmosphere furnace. The furnace was purged for 30 minutes with flowing nitrogen and the temperature increased to 1550° C. over a period of one hour. The temperature was held at 1550° C. for 1 hour and then cooled at the maximum cooling rate possible for the furnace. When the sample reached ambient conditions 3.30 g of product were recovered. The powder was then placed in an alumina tray, placed in a furnace, and heated at 950° C. in air for about 16 hours. (Subsequent experimentation showed that heating at lower temperatures of about 700° C. for about ½ to about 2 hours would satisfactorily remove carbon from the product.) The resulting purified product was analyzed and found to contain 1.30 weight percent carbon, 36.70 weight percent nitrogen, and 59.40 weight percent silicon. The weight percentage of oxygen can be determined from these percentages to be 2.6%. Note that the raw product originally contained about 11 weight percent oxygen.

Figure 8:
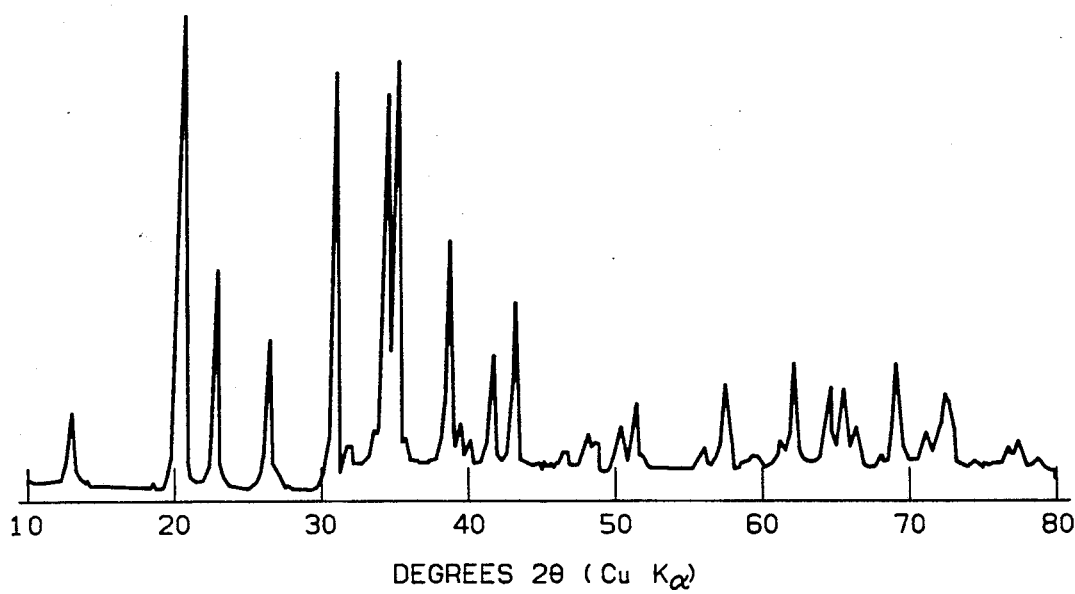
FIG. 8 is an X-ray diffraction pattern for a purified product as produced in Example V.
Figure 9:
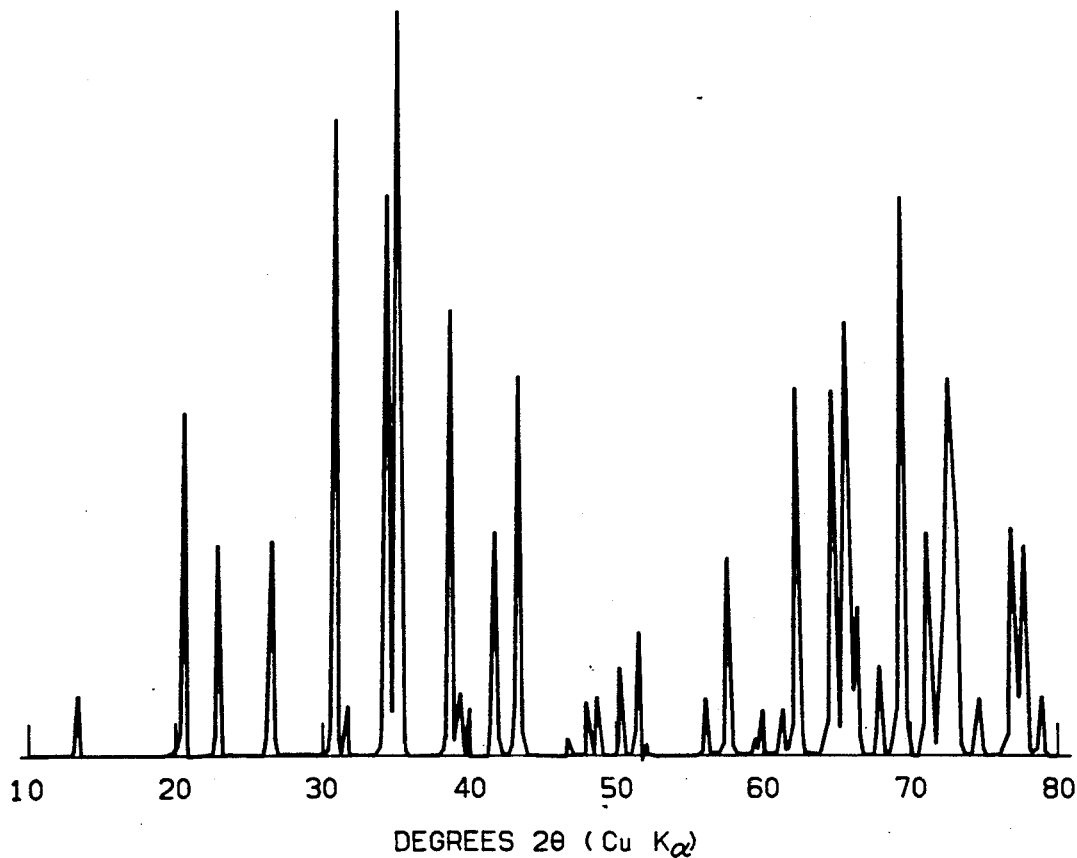
FIG. 9 is an X-ray diffraction for a reference sample of alpha phase silicon nitride.

The purified product produced above was subjected to X-ray powder diffraction analysis. The resulting diffraction pattern is shown in FIG. 8. A reference X-ray diffraction pattern for alpha phase silicon nitride, from JCPDS (9–250), is shown in FIG. 9. It can be seen that the diffraction pattern of FIG. 8, in accordance with the invention, compares very favorably with the reference pattern of FIG. 9.

Figure 10:
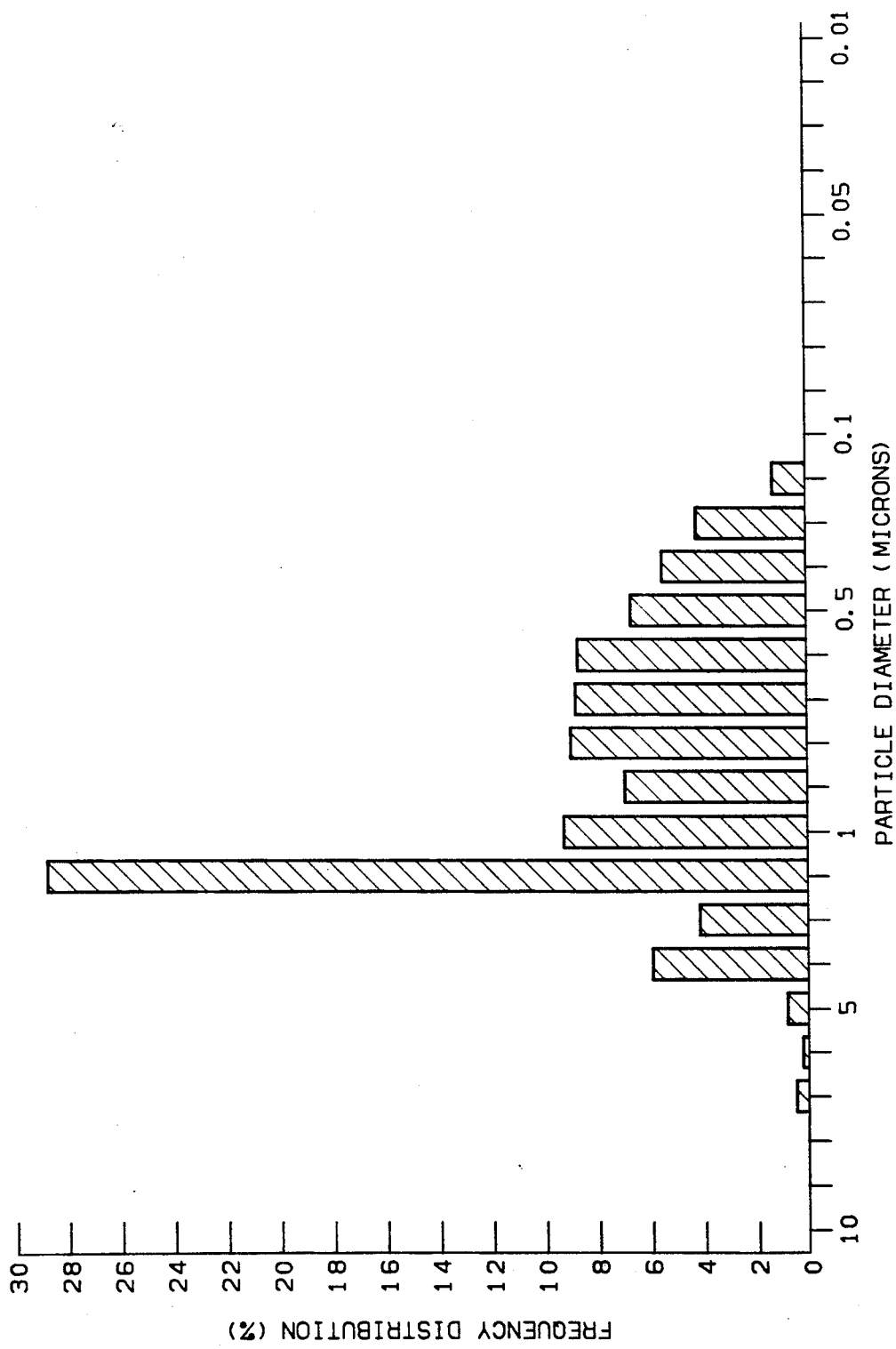
FIG. 10 is a graphical representation of the particle size distribution of the purified product of Example V.

The purified product was analyzed with respect to particle size using the same procedure which was applied to the raw powder. The results of this analysis is shown in FIG. 10 as a bar graph of particle diameter versus frequency distribution. The percentages indicated correspond to diameter ranges in the same manner as in FIG. 7. By way of example, 29% of the examined particles had particle diameters in the range of 1 to 2 microns. Although the product does include particles over 1 micron in diameter, it can be seen that more than 50% of the particles have diameters of 1 micron or less. It can be seen from a comparison of FIGS. 7 and 10 that the particles in the purified product are considerably larger than the particles in the raw product. This is to be expected since furnace processing of the raw product can increase the sizes of the particles due to agglomeration and crystal growth.

EXAMPLE VI

The purpose of the following example is to demonstrate that product produced in accordance with the invention may be sintered to at least 90% of theoretical density and that such sintering may be accomplished even when such product contains oxygen as an impurity.

The run conditions and product analysis are summarized in Table VIA. The reactor of Example I was employed in this run with a flow of hydrogen purge gas at a flow rate of 0.16 g moles/min per nozzle.

TABLE VIA

Use of Silane and Ammonia to Produce Raw Product for Sintering

| Run | Carbon:Oxygen Ratio | Fuel flow gmoles/min | Sidestream Flows | | Analysis | | | |
|---|---|---|---|---|---|---|---|---|
| | | | Silane gmoles/min | Ammonia gmoles/min | C | N | Si(n) | O |
| | | | | | | Wt. percent | | |
| 11 | 1.04 | 1.12 | 0.06 | 0.20 | 1.73 | 28.70 | 65.30 | 13.80 |

In 96 minutes of operation, 212 g of raw product powder was collected employing the conditions summarized in Table VIA.

The product analysis results are strong evidence that the raw product comprises primarily silicon nitride. An X-ray diffraction pattern of the raw product shows only a slight increase in amplitude of the signal between 20° and 40°. This tends to indicate that the product is very poorly crystallized if not amorphous.

A sintering mixture containing 20 g of the raw product produced in run 11, 1.117 g yttrium oxide (H. C. Starck, Berlin, FRG), 1.229 g aluminum oxide (Buehler, Lake Bluff, Ill.), 1.176 g of polyethylene glycol with a molecular weight ranging from 3000–3700 (Union Carbide, Danbury Conn.) and 200 ml of methanol was milled in a planetary mill (Brinkman Instruments, Westbury N.Y.) for 2 hours at a speed setting of 4.2 and subsequently milled for 62 hours at a speed setting of 3. The milled slurry was oven dried at a temperature of 85° C. for 24 hours. The uneven color of the resulting dried material suggested further milling might be advisable and consequently the mixture was milled for 30 minutes at a speed setting of 6. The sample was isostatically compressed at a pressure of 75,000 psi in a mold 1.1 cm×1.1 cm×2.0 cm. The resulting pressed material was placed in a molybdenum crucible on top of a bed of commercial silicon nitride powder (Ube Industries, Japan, SNE-10 powder) and heated in a graphite element resistance furnace without application of a compaction force to the material. Sintering conditions are summarized in Table VIB.

TABLE VIB

Sintering Conditions for Raw Product

| Step | Temperature °C. | Time (min.) | Atmosphere and Pressure |
|---|---|---|---|
| A | 25–450 | 210 | 1000 millitorr (vacuum) with nitrogen purge |
| B | 450–1500 | 210 | 350 psig nitrogen, closed system-no flow |
| C | 1500 | 15 | 100 psig nitrogen, closed system |
| D | 1500–1750 | 25 | closed system with pressure determined by the furnace temperature |
| E | 1750 | 240 | closed system with pressure determined by the furnace temperature |
| F | 1750–1350 | 40 | from a peak of 150 psig the nitrogen pressure decreases as furnace cools |
| G | 1350 | 120 | 35 psig nitrogen |
| H | 1350–25 | | furnace cooled and pressure lowered naturally |

The product from step H was found to have a density of 3.08 g/cc which is 97.8 percent of the "theoretical density", the density of pure crystalline silicon nitride which is taken as about 3.15 g/cc. Density was determined by using Archimedes' principle.

EXAMPLE VII

The purpose of this example is to demonstrate the production of silicon nitride-containing raw product employing a wide range of carbon to oxygen ratios. It is also a purpose of this example to measure the reaction zone temperatures at which raw product is produced. Silane and ammonia are used as reactants.

The reactor of Example I was employed to perform runs 14–19 at the process conditions summarized in Table VIIA. In each of runs 14–19 a helium purge gas was employed at a flow rate of 0.15 gmoles/min per nozzle. No purge gas was used in runs 18 and 19.

TABLE VIIA

Production of Silicon Nitride Using Varying Carbon:Oxygen Ratios and Reaction Zone Temperatures

| Run | Carbon: Oxygen Ratio | Fuel flow gmoles/min | Sidestream Flows Silane gmoles/min | Ammonia gmoles/min | Temperature °C. |
|---|---|---|---|---|---|
| 14 | 1.10 | 1.20 | 0.06 | 0.20 | 1371 |
| 15 | 1.04 | 1.12 | 0.06 | 0.20 | 1449 |
| 16 | 0.93 | 1.02 | 0.06 | 0.20 | 1475 |
| 17 | 0.88 | 0.96 | 0.06 | 0.20 | 1531 |
| 18 | 0.85 | 0.925 | 0.06 | 0.20 | ND |
| 19 | 0.82 | 0.89 | 0.06 | 0.20 | ND |

ND means that a reaction zone temperature was not determined for the indicated runs.

Reaction zone temperature for each of runs 14–17 was measured at a location along the reactor chamber axis and 20 cm upstream from the downstream end of the chamber. A thermocouple comprising bare wires of different compositions was employed to measure these temperatures. The wires were made up of Type B alloys; that is, 94% platinum and 6% rhodium for one wire, and 70% platinum and 30% rhodium for the other wire. The two wires were run through a two hole electrical insulator made of 99.8% alumina and the insulator and wires were encased in a 0.79 cm O.D. 99.8% closed end alumina tube to protect the wires from attack by the silicon reactant. A thermocouple junction was formed by extending the wires about 0.5 cm beyond the alumina insulator and spot welding the wires together. This junction was located on the longitudinal axis of the reactor chamber. Since the reactor walls are insulated and hence operate close to the same temperature as the gases in the chamber, the thermocouple reading were not corrected for radiation error.

The raw product powders collected from runs 14–19 were each analyzed via infrared absorption. Each resulting spectral pattern, plotted as wavenumber versus transmittance, showed a broad absorption between wavenumbers of about 1100 and about 920, indicating silicon-nitrogen bonds and also silicon-oxygen bonds as per the discussion in Example IV with respect to runs 6–8. The spectral patterns corresponding to runs 16–19 show the double band structure similar to that of FIG. 5.

Two control runs were carried out using the same conditions as runs 18 and 19, except that the ammonia flow was terminated and a helium purge gas flow of 0.15 gmoles/min was established through each sidestream reactant nozzle. Therefore only compounds having silicon-oxygen bonds could be produced. The infrared spectral patterns of the resulting products had absorptions, at a wavenumber of around 1100, roughly half the width of those absorptions in the patterns for runs 18 and 19. The remainder of the absorptions at a wavenumber of about 920 did not appear in the infrared patterns of the control runs, thus being further evidence of the presence of silicon nitride in raw product produced in accordance with the invention.

An elemental analysis was performed with respect to the raw product from each of runs 14–19. The results of this analysis are shown in Table VIIB and are further evidence of the presence of silicon nitride.

TABLE VIIB

| Run | Elemental Product Analysis | | | |
|---|---|---|---|---|
| | C wt. % | N wt. % | Si(x) wt. % | O wt. % |
| 14 | 5.8 | 22.6 | 59.1 | 28.3 |
| 15 | 1.2 | 26.8 | 57.2 | 16.8 |
| 16 | 1.0 | 18.0 | 52.2 | 30.3 |
| 17 | 1.3 | 20.5 | 53.3 | 15.0 |
| 18 | 0.9 | 20.9 | 53.9 | 30.8 |
| 19 | 1.1 | 18.8 | 51.6 | 31.8 |

EXAMPLE VIII

The purpose of this example is to report the elemental composition ranges obtained in the production of raw product in the previous examples. The lowest and highest weight percentages for each respective element are provided in Table VIII.

TABLE VIII

| | Composition Ranges for Raw Product | | | |
|---|---|---|---|---|
| | Weight Percent | | | |
| | C | N | Si | O |
| Low | 0.8 | 15.0 | 43.9 | 6.9 |
| High | 5.2 | 32.3 | 67.7 | 31.8 |

That which is claimed is:

1. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;
establishing a flow of a combustible mixture in the combustion zone so as to flow in a direction generally toward the reaction zone, wherein the combustible mixture comprises a mixture of a fuel and an oxidant comprising oxygen;
combusting the combustible mixture in the combustion zone to produce hot combustion products;
injecting at least one reactant into said chamber at said boundary such that the hot combustion products carry said at least one reactant in the reaction zone generally toward said downstream end, wherein temperature conditions in at least a portion of the reaction zone are at least about 1300° C. and wherein the elemental molar ratio of carbon to oxygen for the combination of the combustible mixture and said at least one reactant is at least about 0.7:1, said at least one reactant being capable of reacting in the reaction zone to form a nitride compound;
whereby a product powder comprising the nitride compound is produced in the reaction zone.

2. A method as recited in claim 1 wherein said elemental molar ratio is in the range of about 0.8:1 to about 1.2:1.

3. A method as recited in claim 2 wherein said elemental molar ratio is in the range of about 0.9:1 to about 1.1:1.

4. A method as recited in claim 3 wherein the elemental molar ratio for the combustible mixture is at least about 0.7:1.

5. A method as recited in claim 4 wherein said temperature conditions are in the range of about 1300° C. to about 1700° C.

6. A method as recited in claim 1 wherein the fuel comprises a hydrocarbon selected from the group consisting of an unsaturated hydrocarbon, a cyclic hydrocarbon, and mixtures thereof.

7. A method as recited in claim 6 wherein said hydrocarbon is an unsaturated hydrocarbon which is selected from the group consisting of ethylene, propylene, butene, propadiene, butadiene, acetylene, propyne, butyne, and mixtures thereof.

8. A method as recited in claim 1 wherein said nitride compound is a compound of a first component and a second component, where the second component is nitrogen, said at least one reactant comprising a first reactant containing said first component and also a second reactant containing said second component which react to form said nitride compound.

9. A method as recited in claim 8 wherein said first reactant has a first component selected from the group consisting of silicon, boron, aluminum, tungsten, chromium, titanium and molybdenum.

10. A method as recited in claim 9 wherein said first component is silicon.

11. A method as recited in claim 10 wherein said first reactant is selected from the group consisting of silane, a substituted silane, and mixtures thereof.

12. A method as recited in claim 11 wherein said substituted silane is selected from the group consisting of an alkyl silane, an aryl silane, a halogenated methylsilane, a halogenated silane, a siloxane, a silazane, a silicon halide, and mixtures thereof.

13. A method as recited in claim 11 wherein said first reactant is silane.

14. A method as recited in claim 11 wherein said second reactant is selected from the group consisting of an amine, a hydronitride, and mixtures thereof.

15. A method as recited in claim 14 wherein said second reactant is a hydronitride.

16. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;
providing a first nozzle which comprises a first tubular member having an outlet end which extends into the chamber;
establishing a flow of a combustible mixture in the combustion zone so as to flow in a direction generally toward the reaction zone, wherein the combustible mixture comprises a mixture of a fuel and an oxidant;
combusting the combustible mixture in the combustion zone to produce hot combustion products;
injecting at least one reactant through the first tubular member and out the outlet end thereof into said chamber at said boundary such that the hot combustion products carry said at least one reactant in the reaction zone generally toward said downstream end, wherein temperature conditions in at least a portion of the reaction zone are at least about 1300° C. and wherein the elemental molar ratio of carbon to oxygen for the combination of the combustible mixture and said at least one reactant is at least about 0.7:1, said at least one reactant being capable of reacting in the reaction zone to form a nitride compound;

flowing a generally annular stream of a gas around the first tubular member in the direction of the outlet end of the first tubular member so as to flow into the chamber and so as to generally surround said at least one reactant in its flow from the outlet end;

whereby a product comprising the nitride compound is produced in the reaction zone and deposits on the first nozzle are substantially prevented.

17. A method as recited in claim 1 wherein said nitride compound is a compound of a first component and a second component, wherein said second component is nitrogen and wherein said at least one reactant consists essentially of a single reactant containing said first component, said method further comprising injecting into said chamber in admixture with said at least one reactant a carrier gas selected from the group consisting of helium, argon, hydrogen, carbon monoxide, and mixtures thereof.

18. A method as recited in claim 16 wherein there is further provided a second tubular member which generally surrounds the first tubular member so as to define therebetween a first generally annular space through which said gas flows in said generally annular stream, said second tubular member having an inner sidewall and an outer sidewall which define a second generally annular space therebetween, said method further comprising flowing a coolant fluid through the second annular space during injection of said reactants.

19. A method as recited in claim 18 wherein there is also provided a second nozzle comprising a third tubular member having an outlet end which extends into the chamber and through which fuel and oxidant are injected into the chamber, the third tubular member comprising inner and outer walls which define therebetween a third annular space, said method further comprising flowing a coolant fluid through the third annular space.

20. A method as recited in claim 1 further comprising the step of passing the powder formed in the reaction zone from such zone and through a heat exchanger wherein the powder is cooled.

21. A method as recited in claim 20 further comprising the step of collecting the thus cooled powder.

22. A method as recited in claim 21 further comprising the steps of: adding carbon to the thus collected powder; heating the thus collected powder with added carbon in the presence of a nitrogen-containing gas within the temperature range of about 1300° C. to about 1900° C. for a time of at least about 15 minutes; and then heating the thus collected powder with the added carbon in an oxygen-containing atmosphere within the temperature range of about 600° C. to about 900° C. for a time of at least about 15 minutes.

23. A method as recited in claim 22 wherein the thus collected powder is heated with the added carbon in the nitrogen-containing gas at a temperature of about 1400° C. to about 1700° C. for a time of about 1 hour to about 2 hours and the thus collected powder is heated with the added carbon in the oxygen-containing atmosphere at a temperature of about 600° C. to about 700° C. for a time of about 30 minutes to about 2 hours.

24. A method as recited in claim 7 wherein the fuel comprises a mixture of ethylene and acetylene.

25. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant comprising oxygen;

combusting the combustible mixture in the combustion zone to produce hot combustion products;

injecting at least one reactant into the chamber at said boundary such that said at least one reactant is substantially gaseous as injected into the chamber and such that the hot combustion products carry said at least one reactant in the reaction zone generally toward said downstream end, wherein temperature conditions in at least a portion of the reaction zone are at least about 1300° C. and wherein the elemental molar ratio of carbon to oxygen for the combination of the combustible mixture and said at least one reactant is at least about 0.7:1, said at least one reactant being capable of reacting in the reaction zone to form a nitride compound;

whereby a product powder comprising the nitride compound is produced in the reaction zone.

26. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant;

combusting the combustible mixture in the combustion zone to produce hot combustion products;

injecting at least one reactant into the chamber at said boundary such that the hot combustion products carry said at least one reactant in the reaction zone generally toward said downstream end, wherein temperature conditions in at least a portion of the reaction zone are at least about 1300° C. and wherein the hot combustion products provide at least about 15% of the energy needed to maintain said temperature conditions and further wherein the elemental molar ratio of carbon to oxygen for the combination of the combustible mixture and said at least one reactant is at least about 0.7:1, said at least one reactant being capable of reacting in the reaction zone to form a nitride compound;

whereby a product powder comprising the nitride compound is produced in the reaction zone.

27. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant;

combusting the combustible mixture in the combustion zone to produce hot combustion products, wherein the fuel and oxidant are injected at a flow rate and the combustion zone is dimensioned such that there is substantially no free oxygen at the boundary;

injecting at least one reactant into said chamber at said boundary such that the hot combustion products carry said at least one reactant in the reaction zone generally toward said downstream end, wherein temperature conditions in at least a portion of the reaction zone are at least about 1300° C. and wherein the elemental molar ratio of carbon to oxygen for the combination of the combustible mixture and said at least one reactant is at least about 0.7:1, said at least one reactant being capable of reacting in the reaction zone to form a nitride compound;

whereby a product powder comprising the nitride compound is produced in the reaction zone.

28. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone as so to flow in a direction generally toward the reaction zone, wherein the combustible mixture comprises a mixture of a fuel and an oxidant, and wherein the fuel and oxidant are injected into the chamber at a location closely adjacent to the upstream end of the chamber in a direction generally parallel to the longitudinal axis;

combusting the combustible mixture in the combustion zone to produce hot combustion products;

injecting at least one reactant into said chamber at said boundary in a direction generally perpendicular to the longitudinal axis such that the hot combustion products carry said at least one reactant in the reaction zone generally toward said downstream end, wherein temperature conditions in at least a portion of the reaction zone are at least about 1300° C. and wherein the elemental molar ratio of carbon to oxygen for the combination of the combustible mixture and said at least one reactant is at least about 0.7:1, said at least one reactant being capable of reacting in the reaction zone to form a nitride compound;

whereby a product powder comprising the nitride compound is produced in the reaction zone.

29. A method as recited in claim 15 wherein said hydronitride is ammonia.

30. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant which is injected into the combustion zone and wherein the fuel and oxidant as injected is the only fuel and oxidant injected into the chamber;

combusting the combustible mixture in the combustion zone to produce hot combustion products;

injecting at least one reactant into the chamber at said boundary such that the hot combustion products carry said at least one reactant in the reaction zone generally toward said downstream end, wherein temperature conditions in at least a portion of the reaction zone are at least about 1300° C. and wherein the elemental molar ratio of carbon to oxygen for the combination of the combustible mixture and said at least one reactant is at least about 0.7:1, said at least one reactant being capable of reacting in the reaction zone to form a nitride compound;

whereby a product comprising the nitride compound is produced in the reaction zone.

* * * * *